April 19, 1949.　　　E. C. MUNDHENKE　　　2,467,593
TRACTOR HITCH
Filed Feb. 11, 1946　　　2 Sheets-Sheet 1
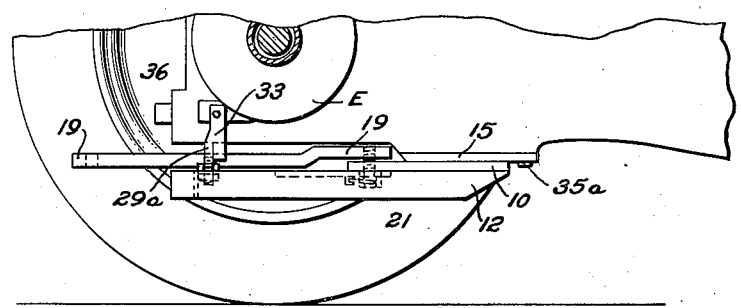
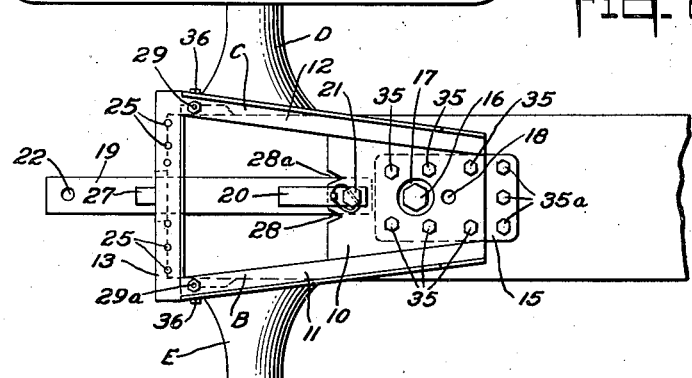
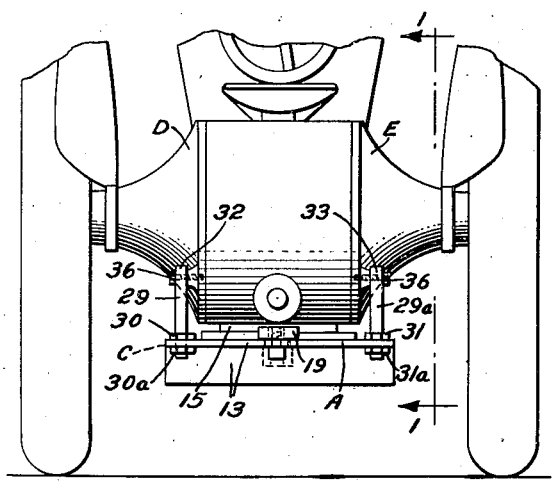
INVENTOR
ERNEST C. MUNDHENKE
BY M. Y. Charles
ATTORNEY April 19, 1949.  E. C. MUNDHENKE  2,467,593
TRACTOR HITCH Filed Feb. 11, 1946  2 Sheets-Sheet 2

INVENTOR.
Ernest C. Mundhenke
BY
M. Y. Charles
ATTORNEY.

Patented Apr. 19, 1949

2,467,593

UNITED STATES PATENT OFFICE 2,467,593

TRACTOR HITCH

Ernest C. Mundhenke, Lewis, Kans.

Application February 11, 1946, Serial No. 646,873

1 Claim. (Cl. 280—33.44)

My invention relates to an improvement in tractor hitches. This tractor hitch is designed primarily to be applied to a Fordson tractor, although it may be adapted for use on other makes of tractor.

The tractor on which this hitch is designed to be used is of the type in which the engine and transmission case, differential and rear axle housing form the frame of the machine, and the bottom of the transmission case is provided with a removable plate that is provided with an oil drainage opening in which is threaded a plug as a closure for the oil drainage opening. The plate is rigidly held on the bottom of the transmission case by means of a series of cap screws that pass through the plate and are threaded into the transmission case.

The design of my tractor hitch is such that the hitch plate will fit over the rear portion of the transmission plate and the bolt holes therein will register with those of the transmission plate and the same bolts that hold the transmission plate on the bottom of the transmission case will also hold my improved tractor hitch on the bottom of the transmission case.

A further object of the invention is to provide a tractor hitch of the kind mentioned which, when installed on the tractor will not interfere with other attachments that may want to be added to the tractor regardless of whether they utilize power from the power take-off of the tractor or not.

A still further object is to provide a tractor hitch of the kind mentioned that is simple, easy, and inexpensive to make, simple to install, as well as one that is strong, sturdy, and long lived.

Tractors of the type mentioned usually have a worm and worm wheel drive, and if a load is attached to the tractor that is heavy and about all or more than the tractor can pull and move along with, there is a tendency on the part of the tractor for the worm to travel around the worm wheel and lift the front end of the tractor from the ground, and it has happened that this action continued to such a point that the front end of the tractor raised enough that it fell over backward and turned the tractor upside down. In view of this trouble it is a further object of my improved tractor hitch, due to its point of attachment to the tractor to alleviate at least a part of this trouble. This and other objects will be more fully explained as their description progresses.

Now referring to the accompanying drawings in which similar numerals of reference designate the same parts throughout the several figures of the drawings—

Figure 1 is sectional view of the tractor the view being taken along the line I—I in Fig. 3 and looking in the direction of the arrows.

Fig. 2 is a bottom plan view of the rear portion of the tractor and showing my improved tractor hitch applied thereto.

Fig. 3 is a rear view of the tractor on which my improved tractor hitch is installed.

Figure 4:
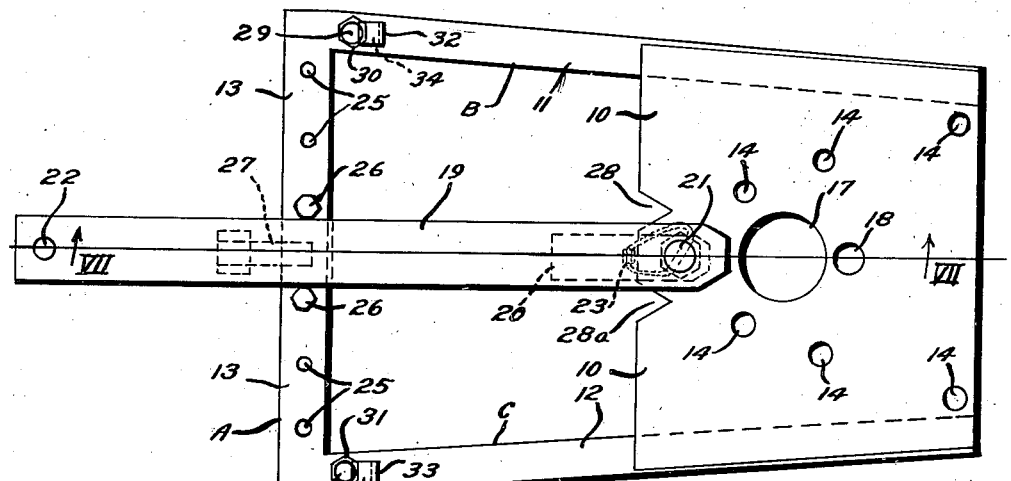
Fig. 4 is a detail top plan view of the tractor hitch.
Figure 5:
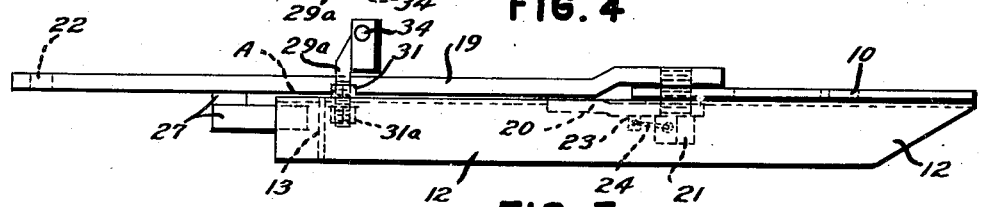
Fig. 5 is a detail side view of the tractor hitch.
Figure 6:
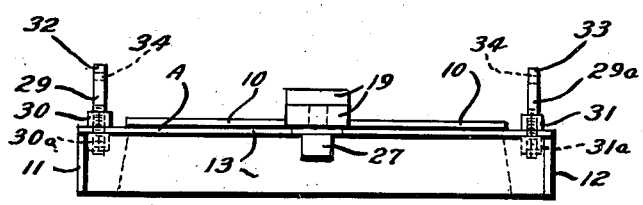
Fig. 6 is a detail rear end view of the tractor hitch.
Figure 7:
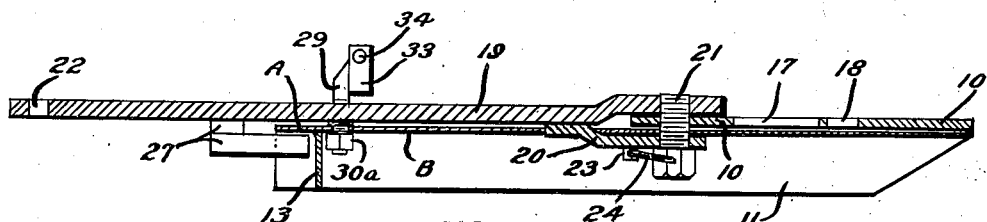
Fig. 7 is a detail longitudinal sectional view of the tractor hitch, the view being taken along the line VII—VII in Fig. 4 and looking in the direction of the arrows.

In the drawings the tractor hitch is shown as having an attachment plate 10 to which angle irons 11 and 12 are welded to the opposite side edges thereof and project forwardly therefrom at a diverging angle to each other and a cross angle iron 13 is welded to the outer ends of the side angles 11 and 12. The attachment plate 10 is provided with a series of bolt holes 14 that are positioned so that they will register with bolt holes in the transmission plate 15. The transmission plate 15 is provided with an oil drainage hole in which is threaded a plug 16 that projects downwardly from the transmission plate 15, and the tractor hitch attachment plate 10 is provided with a hole 17 in which the plug 16 is received and may be removed therethrough. The tractor hitch attachment plate 10 is also provided with a second hole 18 to receive a projection left on the transmission plate 15 in the process of casting the plate 15.

The tractor hitch is provided with a draw bar 19, one end of which rests on top of the rear end of the attachment plate 10. Welded to the bottom side of the draw bar 19 is one end of a bar 20 the other end of which passes under the hitch plate 10. A bolt 21 passes through the bar 20, plate 10, and is threaded into the end of the draw bar 19 as a pivotal means of attaching the draw bar 19 to the attachment plate 10. The rear end of the draw bar 19 is provided with a hole 22 to receive a pin for attaching implements or the like to the draw bar 19.

The plate 20 is provided with a small cap screw 23 that is threaded into the bar 20, and the heads of the cap screw 23 and the head of the bolt 21 have holes therein through which a wire 24 is threaded and tied or twisted as a means of keeping the screw 23 and bolt 21 from unscrewing or loosening.

The horizontal leg A of the cross angle iron 13 is provided with a series of holes 25 in which bolts 26 may be placed on either side of the draw bar 19 as a means of limiting the side way swing of the draw bar 19. On the under side of the draw bar 19 is welded a lip like element 27 that extends under the horizontal leg A of the angle iron cross member 13 and prevents the lifting of the draw bar 19 from the cross member 13.

The rear edge of the attachment plate 10 is provided with a pair of notches 28 and 28a that are positioned one on either side of the draw bar 19 and provide room into which the sides of the draw bar 19 may move as the draw bar 19 is swinging from side to side.

The rear end of each of the side angle irons 11 and 12 are provided with a bolt 29 and 29a that pass through the horizontal legs B and C of the angle irons 11 and 12 and rigidly held in vertically adjusted position by means of nuts 30, 30a, and 31 and 31a that are threaded on the bolt and positioned one on either side of their respective angle iron leg B and C. Plate like elements 32 and 33 are welded to one side of each bolt 29 and 29a and the plates 32 and 33 have a hole 34 therein to receive bolts for attachment to the tractor as will later be described.

The rear axle housing members of the tractor are bolted to opposite sides of the differential case in the usual manner, and other bolts 36 are also present in the axle housings D and E or brackets integrally formed thereon.

The transmission case bottom plate 15 is held in place on the bottom of the transmission case by means of cap screws 35 and 35a.

To attach the tractor hitch to the tractor, the bolts 36 are removed, and the cap screws or bolts 35 are removed from the tractor, leaving the cap screws 35a to hold the transmission plate 15 on the bottom of the transmission case, whereupon the hitch may be placed under the tractor and then raised into place against the bottom of the transmission cover plate 15 as shown in Figures 1, 2, and 3, whereupon the cap screws 35 may be passed through the holes 14 of the attachment plate 10 and replaced through the transmission plate 15 and screwed into the transmission case as they originally were. The cap screws 35 may have to be replaced with longer cap screws of the same size to make up for the thickness of the attachment plate 10 through which they pass. This having been done, the bolts 36 are passed through the holes 34 in the plates 33 and screwed into the screw holes from where they originally came, whereupon the tractor hitch is attached to the tractor in a position out of the way of other attachments that may be attached to the tractor. The tractor hitch having been thus mounted on the tractor the nuts 30 and 30a, and 31 and 31a may be screwed up or down on their respective bolt 29 or 29a to support the rear end of the tractor hitch and thereby relieve any leverage therefrom that might be imposed on the cap screws 35. The tractor and tractor hitch is now ready for use.

Such modification of my invention may be employed as lie within the scope of the appended claim without departing from the spirit and intention of the invention. Now having fully shown and described my invention, what I claim as new and desire to secure by Letters Patent is:

In a tractor hitch device of the kind described, an attachment plate, said attachment plate being adapted to fit against a transmission closure plate on the bottom of a tractor transmission and having an oil drainage passage therethrough in registry with an oil drainage passage in said transmission plate cover and means for holding said attachment plate on the bottom of the transmission plate by the same means that originally held the transmission plate on the bottom of the transmission case, the rear end of the attachment plate extending rearwardly beyond the transmission closure plate, a drawbar, one end of said drawbar being pivotally attached to the attachment plate in and behind the transmission cover plate, a support for the drawbar, said support comprising a pair of angle irons, said angle irons being welded, one to each opposite side edge of the attachment plate and extending rearwardly therefrom, a cross draw bar support member, said cross member being attached to the rear ends of the said angle irons and being positioned forward of the rearmost point of the differential case of the tractor and means for holding the drawbar in angular adjusted positions relative to the longitudinal central axis of the tractor and means for adjustably supporting the outer ends of said angle irons.

ERNEST C. MUNDHENKE.

REFERENCES CITED

The following references are of record in the file of this patent:

UNITED STATES PATENTS

| Number | Name | Date |
| --- | --- | --- |
| 1,379,399 | Ferguson | May 24, 1921 |
| 1,462,685 | Counter | July 24, 1923 |
| 1,715,682 | Starks | June 4, 1924 |